March 16, 1954  F. S. CARLILE  2,671,944
APPARATUS FOR MANUFACTURING BATTERY
GRIDS OF CALCIUM AND LEAD ALLOY
Filed April 3, 1952  2 Sheets-Sheet 2
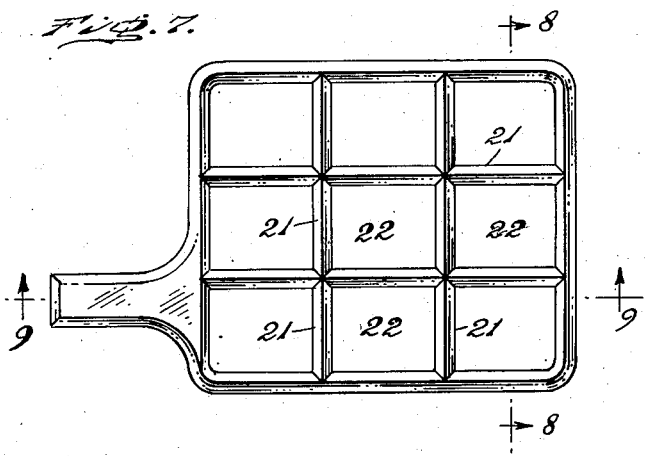
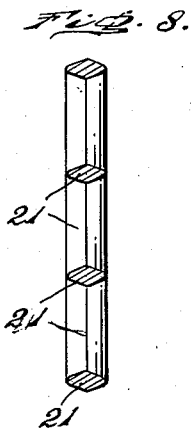
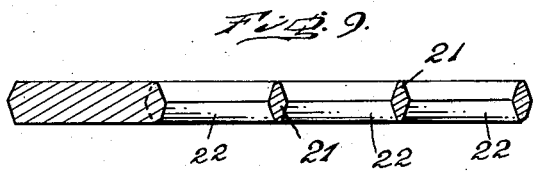
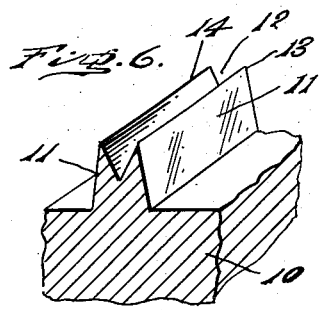
INVENTOR
Frank S. Carlile.
BY
Robert M. Barr
ATTORNEY.

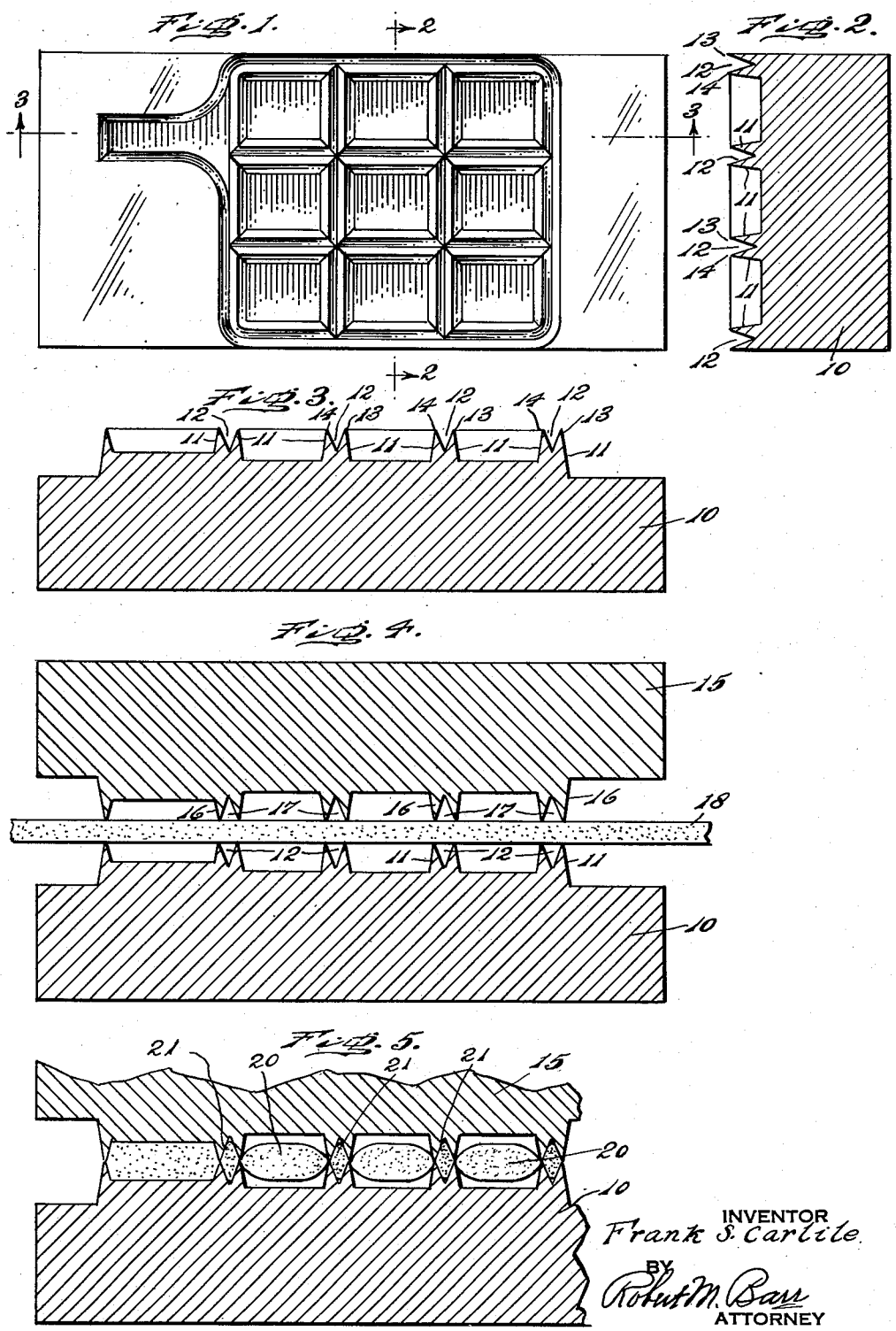

Patented Mar. 16, 1954

2,671,944

UNITED STATES PATENT OFFICE 2,671,944

APPARATUS FOR MANUFACTURING BATTERY GRIDS OF CALCIUM AND LEAD ALLOY

Frank S. Carlile, North Hills, Pa., assignor to C & D Batteries, Inc., Conshohocken, Pa., a corporation of Pennsylvania Application April 3, 1952, Serial No. 280,418

4 Claims. (Cl. 29—2)

The present invention relates to the manufacture of lead grids for storage batteries and more particularly to grids made of an alloy of calcium and lead.

In grids as heretofore made of an alloy of antimony and lead it is usual to provide molds into which the molten metal is poured and set, such molds generally casting a plurality of grids which are then separated into individual grids. One objection to such an alloy is that the elements are of different polarity so that in use there is a bucking of voltage detrimental to battery life and efficiency. As an answer to the disadvantages of this type of alloy it was proposed to use an alloy of calcium and lead because here the polarity is the same for both elements, but then the problem arose as to how to make the grids, it having been found the usual casting resulted in imperfect grid structure. This was due to the sensitivity of calcium to oxidation so that when flowing the molten metal into a mold the alloy absorbed oxygen, causing blow holes or dross inclusions in the cast grid, to result in rapid deterioration of the grid in use. As an alternative to casting it was proposed to form a grid from a lead sheet by using a conventional punching die, but here again difficulties arose. First there is a definite relationship to the thickness of the metal being punched and the width of the bars or framework which form the grid itself. The net result is a very wide surface member which is detrimental to the design and performance of the battery. Secondly, the ductile nature of the lead makes it difficult to shear cleanly and during the punching operation the resultant bars are deformed so that they are nonsymmetrical, having a rounded edge where the die first penetrated the sheet and a drawn feathered edge where the die cut through the sheet.

Some of the objects of the present invention are to overcome the aforesaid difficulties and disadvantages in making grids of calcium lead alloy; to provide an improved apparatus for making battery grids of a calcium lead alloy; to provide an apparatus for forming battery grids from a calcium lead alloy which ensures finished grids free from dross, blow holes and other defects; to provide means operating upon a rolled sheet of calcium lead having a thickness accurately proportioned to the thickness of the grid to be formed; to provide an apparatus including a novel dies for forming a battery grid wherein extrusion or transfer of metal occurs in a sheet of calcium lead alloy to form uniform symmetrical grid bars of accurate diamond shape cross section; to provide an apparatus for forming battery grids from a rolled sheet of calcium lead while eliminating any punching operation with its resultant disadvantages; and to provide other advantages and objects as will appear hereinafter.

In the accompanying drawings, Fig. 1 represents a plan of one-half of a grid-forming die of the present invention, and can be either the top or bottom half since both are alike and coact together upon a bar of lead calcium alloy to form a grid of predetermined latticed configuration; Fig. 2 represents a section on line 2—2 of Fig. 1; Fig. 3 represents a section on line 3—3 of Fig. 1; Fig. 4 represents a vertical section through the assembled die but showing the two parts in open position with the bar to be operated upon between the die parts; Fig. 5 is a like view showing the die closed about the extended metal; Fig. 6 is a perspective detail on an enlarged scale showing the rib and groove die extruding elements; Fig. 7 represents a plan of the finished grid except one of the pellets formed by the operation has been left in as illustrative of the appearance of the grid when removed from the die; Fig. 8 represents a section on line 8—8 of Fig. 7; and Fig. 9 represents a section on line 9—9 of Fig. 7.

Referring to the drawings, one half of a two part die is shown in Fig. 1, illustratively the bottom half, comprising a body 10 having its upper face formed as the complemental half of the grid to be produced thereby. Generally this resultant grid is of the customary latticed formation with its attached terminal lug and to that end the die face is formed with a complemental lattice comprising cutting and extruding members projecting from the die face, each member having a cross section defining a pair of triangular ribs 11 spacing a groove 12, which latter receives the extruded metal to produce the rib apex for one side of the completed grid. The ribs 11 are accurately dimensioned and project outwardly from the face of the body 10 a distance equal to one half of the thickness of the grid to be formed, where each terminates in a cutting edge 13 and 14. The groove 12 is of precise V-section and the depth of the cut is one half the thickness of the finished grid rib. The function of the bottom die part therefor is to form one complete half of the finished grid.

While the foregoing is directed to the bottom half of the die, the description applies equally well to the top half 15 wherein the lattice is formed by cutting and extruding members projecting from the die part face, each member having a cross section defining a pair of triangular ribs 16 spacing a groove 17, which latter receives the extruded metal to produce the rib apex for that side of the completed grid. The groove 17 is of precise V-section having a depth cut equal to one half of the thickness of the grid to be formed. The pairs of cutting members are symmetrically arranged in such spaced apart lattice relation as to form and bound a plurality of square pockets into each of which the waste metal is free to flow as the die parts are closed to extrude the rib-forming material into the V groove of the members.

The metal from which the grid is to be formed by the forging action of the die is in the form of a flat sheet 18 fabricated from a cast ingot by means of a rolling mill which produces the densest form of lead free of blow holes or dross inclusions and generally has a non-crystalline structure. The thickness of the sheet 18 bears a very critical relation to the thickness of the desired grid and the solving of the problem by the present invention; therefore it has been found to produce an accurate sharp cameo in the finished grid, the thickness of the sheet 18 should be somewhat thinner than the thickness of the finished grid.

Referring to Fig. 4, the two die parts 10 and 15 are shown in open position with the sheet 18 of calcium lead in place to be acted upon by the closing of the die. It will be observed that the respective cutting edges of the two die halves are in vertical alinement so that the lower set react as anvils to the upper set acting through the sheet 18 to extrude the metal into the opposed grooves 12 and 17, and form finished ribs which are substantially diamond shape in cross section. This resulting action is shown in Fig. 5, but since the extruding of the metal leaves side fins of about one thousandth of an inch in thickness along the respective sides of the forged ribs, the forged unit appears as diamond shaped ribs 21 bounding squares respectively including metal pellets 20 fragilely held by the aforesaid microscopic fins. These pellets 20, when pushed out, respectively provide the open squares 22 of the lattice of the finished grid.

The finished grid as shown in Figs. 7, 8, and 9 is of latticed pattern formed by ribs 21 having oppositely disposed clean cut apices which together produce a cross section of diamond shape. The apertures 22 of the lattice result from the removal of the aforesaid pellets 20 and serve to receive the active material to complete the grid for use.

While the invention as here described applies primarily to rolled sheets of calcium lead alloy, it is not to be considered as specifically limited to rolled sheets, because the sheet could be extruded or continuously cast and acted upon by the apparatus of the invention to produce the desired sharply defined pattern ribs of a grid. Also, sheets of other lead alloys are contemplated as adaptable for extrusion by the present invention.

It will now be apparent that a novel cutting and extruding mechanism in combination with a rolled metal sheet of calcium lead alloy has been devised for forming a storage battery grid by extruding the metal from opposite sides of the bar to form respectively clean cut apex shaped ribs in lattice formation.

Having thus described my invention, I claim:

1. An apparatus for forming a storage battery grid from a rolled sheet of calcium lead alloy, comprising a two part die, each part having a working face with a like cameo lattice thereon complemental to the grid to be formed, said lattice being formed by pairs of projecting cutting and extruding members spaced to form waste metal receiving pockets, and each member forming an intermediate groove of V-shaped cross section, whereby said grooves in alined operative relation receive extruded metal and form grid ribs of diamond shaped cross section.

2. An apparatus in accordance with claim 1 wherein the grooves have a depth equal to one half the thickness of the battery grid to be formed.

3. An apparatus for forming a storage battery grid from a sheet of lead alloy, comprising a two part die, each part having a working face with a like cameo lattice thereon complemental to the grid to be formed, said lattice being formed by pairs of projecting cutting and extruding members spaced to form waste metal receiving pockets, and each member forming an intermediate groove of V-shaped cross section, whereby said grooves in alined operative relation receive extruded metal and form grid ribs of diamond shaped cross section.

4. An apparatus for forming a storage battery grid from a sheet of lead alloy, comprising a two-part die having juxtaposed working faces, pairs of V-shaped cutting and extruding members outwardly projecting from each face in square formation to provide a latticed material-receiving V-shaped groove bounding waste metal receiving pockets, the apices of each pair of members on one face being in alinement with the apices of each pair of members on the other face, whereby said apices coact oppositely as piercing means to extrude the metal into said grooves in the form of ribs of diamond shape bounding said pockets and to cause waste metal to flow into said pockets.

FRANK S. CARLILE.

References Cited in the file of this patent

UNITED STATES PATENTS

| Number | Name | Date |
| --- | --- | --- |
| 1,447,781 | Holland et al. | Mar. 6, 1923 |
| 1,547,038 | Holland et al | July 21, 1925 |
| 1,676,366 | Smith | July 10, 1928 |